(12) United States Patent
Kosugi et al.

(10) Patent No.: US 10,585,510 B2
(45) Date of Patent: Mar. 10, 2020

(54) APPARATUS, SYSTEMS, AND METHODS FOR TRANSFERRING OBJECTS BETWEEN MULTIPLE DISPLAY UNITS

(71) Applicant: LENOVO (Singapore) PTE. LTD., New Tech Park (SG)

(72) Inventors: Kazuhiro Kosugi, Yokohama (JP); Hiroki Oda, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 5 days.

(21) Appl. No.: 15/794,970

(22) Filed: Oct. 26, 2017

(65) Prior Publication Data

US 2018/0113550 A1  Apr. 26, 2018

(30) Foreign Application Priority Data

Oct. 26, 2016  (JP) .................. 2016-209650

(51) Int. Cl.
*G06F 3/041* (2006.01)
*G06F 3/0484* (2013.01)
*G06F 3/14* (2006.01)

(52) U.S. Cl.
CPC ........ *G06F 3/0412* (2013.01); *G06F 3/04842* (2013.01); *G06F 3/1454* (2013.01)

(58) Field of Classification Search
CPC .................................................. G06F 3/0412
USPC ........................................................ 345/173
See application file for complete search history.

(56) References Cited

U.S. PATENT DOCUMENTS

| 2011/0109567 A1* | 5/2011 | Kim ...................... G06F 1/1641 345/173 |
| 2011/0296329 A1* | 12/2011 | Tanaka .................. G06F 1/1647 715/769 |
| 2013/0076597 A1* | 3/2013 | Becze ................... G06F 3/1438 345/1.3 |

FOREIGN PATENT DOCUMENTS

| JP | 2010129051 A | 6/2010 |
| JP | 2011248784 A | 12/2010 |
| JP | 2012027940 A | 2/2012 |
| JP | 2012203690 A | 10/2012 |
| JP | 2015233198 A | 12/2015 |
| WO | 2010028402 A1 | 3/2010 |

* cited by examiner

*Primary Examiner* — Long D Pham
(74) *Attorney, Agent, or Firm* — Kunzler Bean & Adamson

(57) ABSTRACT

An apparatus for transferring objects between multiple display units includes a processor of an information handling device and a memory that stores code executable by the processor. The code is executable by the processor to detect a screen object and/or a pointing input mechanism selecting the screen object being moved to a predetermined region of a first display unit and, in response to the detection, display at least part of the screen object on a second display unit.

19 Claims, 9 Drawing Sheets

APPARATUS, SYSTEMS, AND METHODS FOR TRANSFERRING OBJECTS BETWEEN MULTIPLE DISPLAY UNITS

CROSS-REFERENCE TO RELATED APPLICATIONS

This patent application claims priority to Japan Patent Application No. JP2016-209650 filed on 26 Oct. 2016 for Kosugi, et al., the entire contents of which are incorporated herein by reference for all purposes.

FIELD

This disclosure relates to an information processing device, an image display method, and an image display program, and particularly to apparatus, systems, methods, and computer program products for transferring objects between multiple display units.

BACKGROUND

Recently, portable computing devices (e.g., laptop computers) having double screens have been developed. For example, Japan Patent Application No. JP2015-233198 discloses a portable computing device including a first casing provided with a first touch display and a second casing provided with a second touch display.

BRIEF SUMMARY

Various embodiments provide apparatus, systems, methods, and computer program products for transferring objects between multiple display units. In one embodiment, an apparatus includes a processor of an information handling device and a memory. The memory stores code executable by the processor to detect a screen object and/or a pointing input mechanism selecting the screen object being moved to a predetermined region of a first display unit and, in response to the detection, display at least part of the screen object on a second display unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
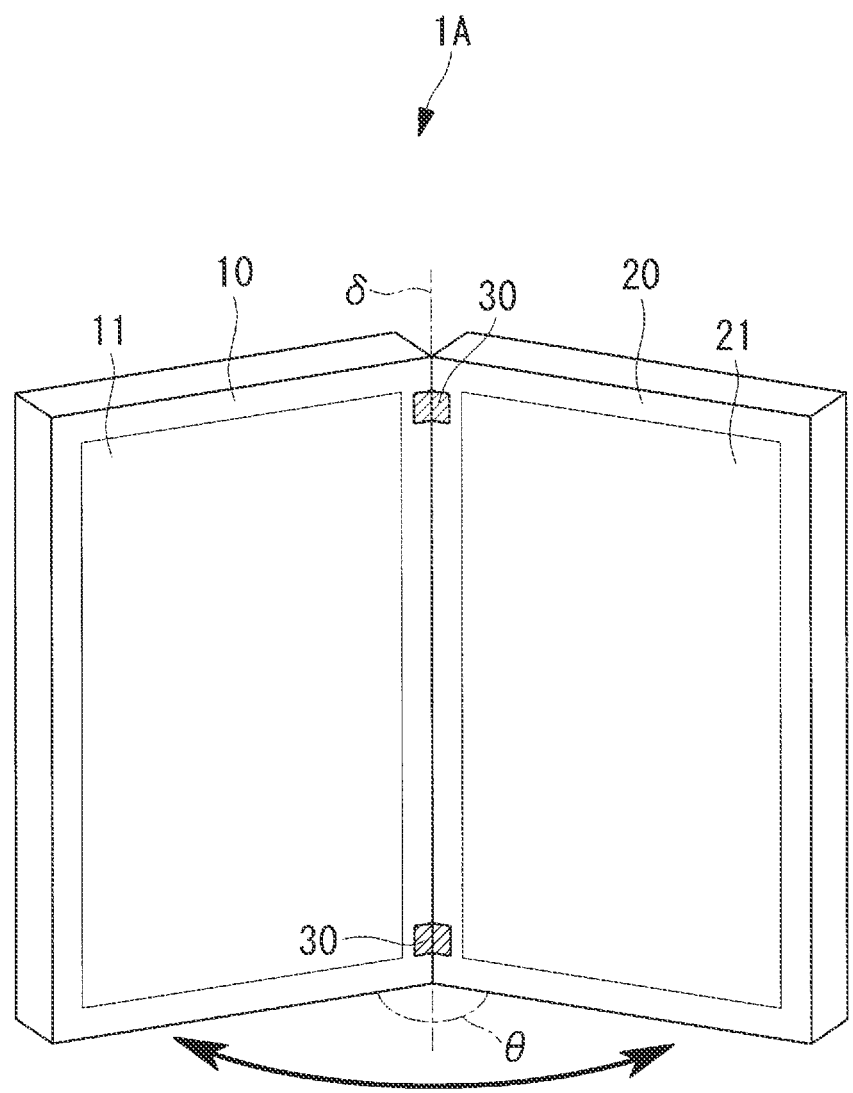
FIG. 1 is a diagram illustrating the appearance structure of a portable information processing device in accordance with one embodiment.

Various embodiments include an information processing device, an image display method, and an image display program. In some embodiments, a user may use a portable information processing device with multiple screens arranged up and down to perform operations to move a window from the lower screen to the upper screen in a continuous fashion. As a user moves the window from the lower screen to the upper screen, the window may be maximized near the upper side of the lower screen depending on the setting of an operation system (OS), which can prevent the window from being moved onto the upper screen.

Further, since a pointing input mechanism (e.g., a human finger, stylus, pen, etc.) cannot continue to touch across multiple screens, it can be difficult to move the window displayed on the first touch display unit to the second touch display unit. Various embodiments discussed herein address at least this issue.

An information processing device according to one embodiment includes, among other components, an information processing device including multiple display units that can accept a touch operation with a pointing input mechanism to input an operation instruction on an object this is displayed, a movement determination unit that determines whether part of a screen object or the pointing input mechanism selecting the screen object is moved to enter a predetermined region provided near a side of one display unit on which the screen object displayed and/or to which another display unit adjoins, and an image control unit that displays, on the other display unit, at least part of the screen object when the movement determination unit determines that part of the screen object or the pointing input mechanism selecting the screen object is moved to a predetermined region.

An image display method according to another embodiment includes an image display method for an information processing device including multiple display units. The method can include determining whether part of a screen object or a pointing input mechanism selecting the screen object is moved to enter a predetermined region provided near a side of one display unit including the screen object displayed thereon and to which another display unit adjoins in the multiple display units capable of accepting a touch operation with a pointing input mechanism to input an operation instruction on an object to be displayed. The method can further include displaying at least part of the screen object on the other display unit in response to determining that part of the screen object or the pointing input mechanism selecting the screen object is moved to the predetermined region.

An image display program according to still another embodiment includes an image display program for an information processing device including multiple display units. The image display program can include a first process of determining whether part of a screen object or a pointing input mechanism selecting the screen object is moved to enter a predetermined region provided near a side of one display unit having the screen object displayed thereon and to which another display unit adjoins in the multiple display units capable of accepting a touch operation with a pointing input mechanism to input an operation instruction on an object to be displayed. The image display program can further include a second process of displaying at least part of the screen object on the other display unit in response to determining that part of the screen object or the pointing input mechanism selecting the screen object is moved to the predetermined region.

Turning to the figures, FIG. 1 is a perspective view illustrating the appearance structure of a portable information processing device according to one embodiment.

A portable information processing device 1A according to one embodiment includes, among other components, a first chassis 10 and a second chassis 20 in which the first chassis 10 and the second chassis 20 are coupled in a foldable manner through coupling mechanisms (e.g., hinges, etc.) 30. A first chassis 10 can include, among other components, a substantially rectangular shape and a first display unit 11 to display images on one side of the first chassis 10. A second chassis 20 can include, among other components, a substantially rectangular shape and a second display unit 21 on one side of the second chassis 20. The first chassis 10 and the second chassis 20 are so described that the back faces of the respective display units will be the back faces of each respective chassis.

In the following description, the first chassis 10 and the second chassis 20 may be simply called "the chassis" when no distinction is made between both, and the first display unit 11 and the second display unit 21 may be simply called "the display unit" when no distinction is made between both.

On each face of the first chassis 10 and the second chassis 20, an operational input, such as a button, to power ON or power OFF the portable information processing device 1A, and a connecting part such as a Universal Serial Bus (USB) connectable to another information processing device and a storage medium are provided. Further, in the first chassis 10 and the second chassis 20, a camera, a speaker, a microphone, and/or the like can be provided. Note that an interface used as a connecting part to connect to external peripheral devices is not limited to a USB and other suitable interfaces, such as the High-Definition Multimedia Interface (HDMI) standard and/or a Digital Visual Interface (DVI) standard may also be included.

The hinges 30 can couple the first chassis 10 and the second chassis 20 in a manner that can allow the first chassis 10 and the second chassis 20 to rotate 360 degrees about a rotating axis δ and to adjoin the first display unit 11 and the second display unit 21 to each other. As such, the hinges 30 can allow the portable information processing device 1A to take on various configuration states.

An angle between the first chassis 10 and the second chassis 20 (hereinafter called, "orientation angle") is defined as "θ." When the orientation angle is smaller than 90 degrees, the first display unit 11 and the second display unit 21 face each other and form an internal surface of the portable information processing device 1A.

Figure 2C:
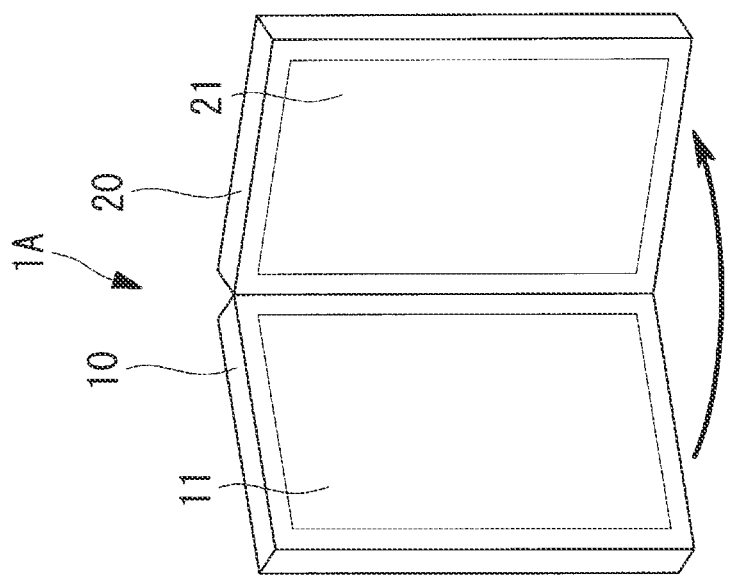
FIGS. 2A through 2C are diagrams illustrating various states of the portable information processing device in accordance with the embodiment illustrated in FIG. 1.
Figure 2B:
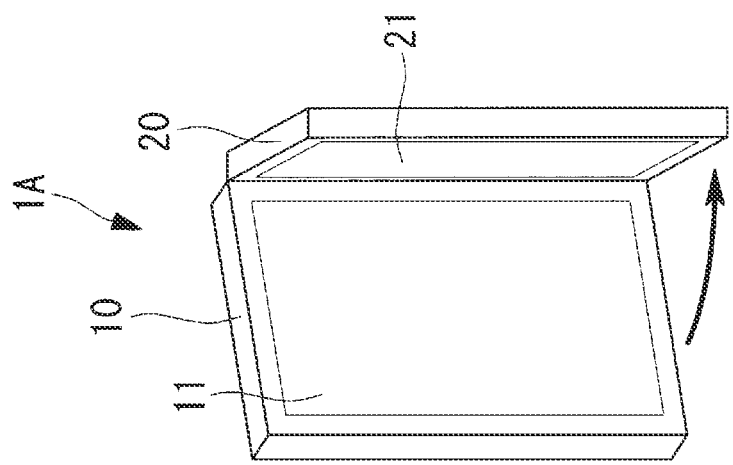
Figure 2A:
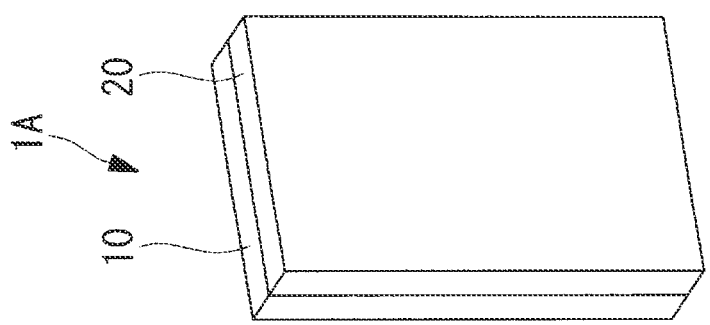

FIGS. 2A through 2C, FIG. 3A, and FIG. 3B are schematic diagrams illustrating various open and closed states of a portable information processing device 1A. That is, the portable information processing device 1A can take various configurations defined by the orientation of the first display unit 11 and the second display unit 21. Specifically, FIG. 2A illustrates a "closed" state in which orientation angle θ=0 degrees and the portable information processing device 1A is closed. FIGS. 2B and 2C illustrate "book" states in which the rotating axis δ is in the vertical direction and the orientation angle is 0 degrees<θ<180 degrees.

Note that FIG. 2B is a book state in which the orientation angle is 90 degrees or less, and FIG. 2C is a book state in which the orientation angle is 90 degrees <θ<180 degrees. Further, in FIGS. 2B and 2C a state in which the rotating axis δ is in the horizontal direction is also called a "clamshell" state.

Figure 3B:
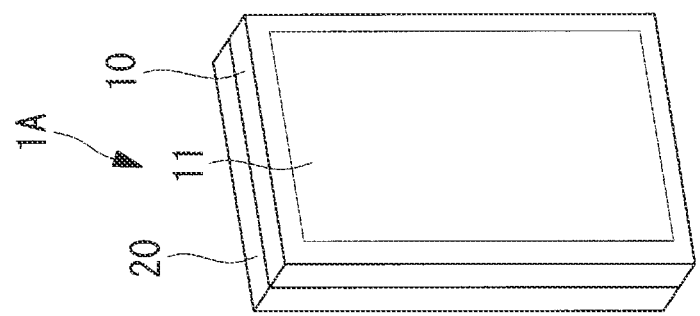
FIGS. 3A and 3B are diagrams illustrating various states of the portable information processing device in accordance with the embodiment illustrated in FIG. 1.
Figure 3A:
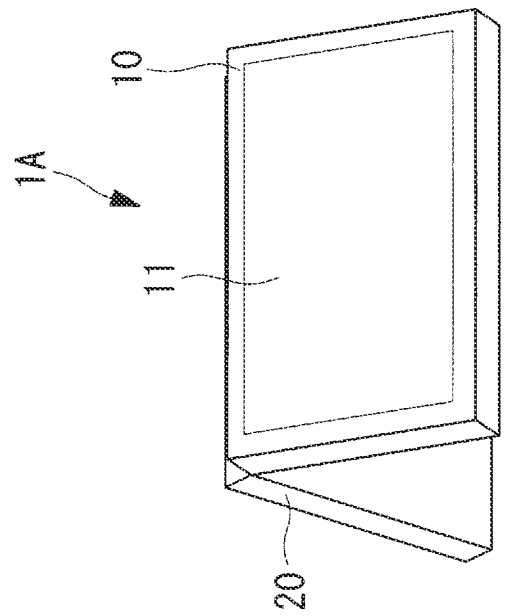

FIG. 3A illustrates a "tent" state in which the rotating axis δ is in the horizontal direction and the orientation angle is 180 degrees<θ<360 degrees. FIG. 3B illustrates a "tablet" state in which the orientation angle θ=360 degrees and the first display unit 11 and the second display unit 21 are opposed to each other while facing outward, respectively. In this embodiment, a user can have visual contact with either the first display unit 11 or the second display unit 21.

Figure 4:
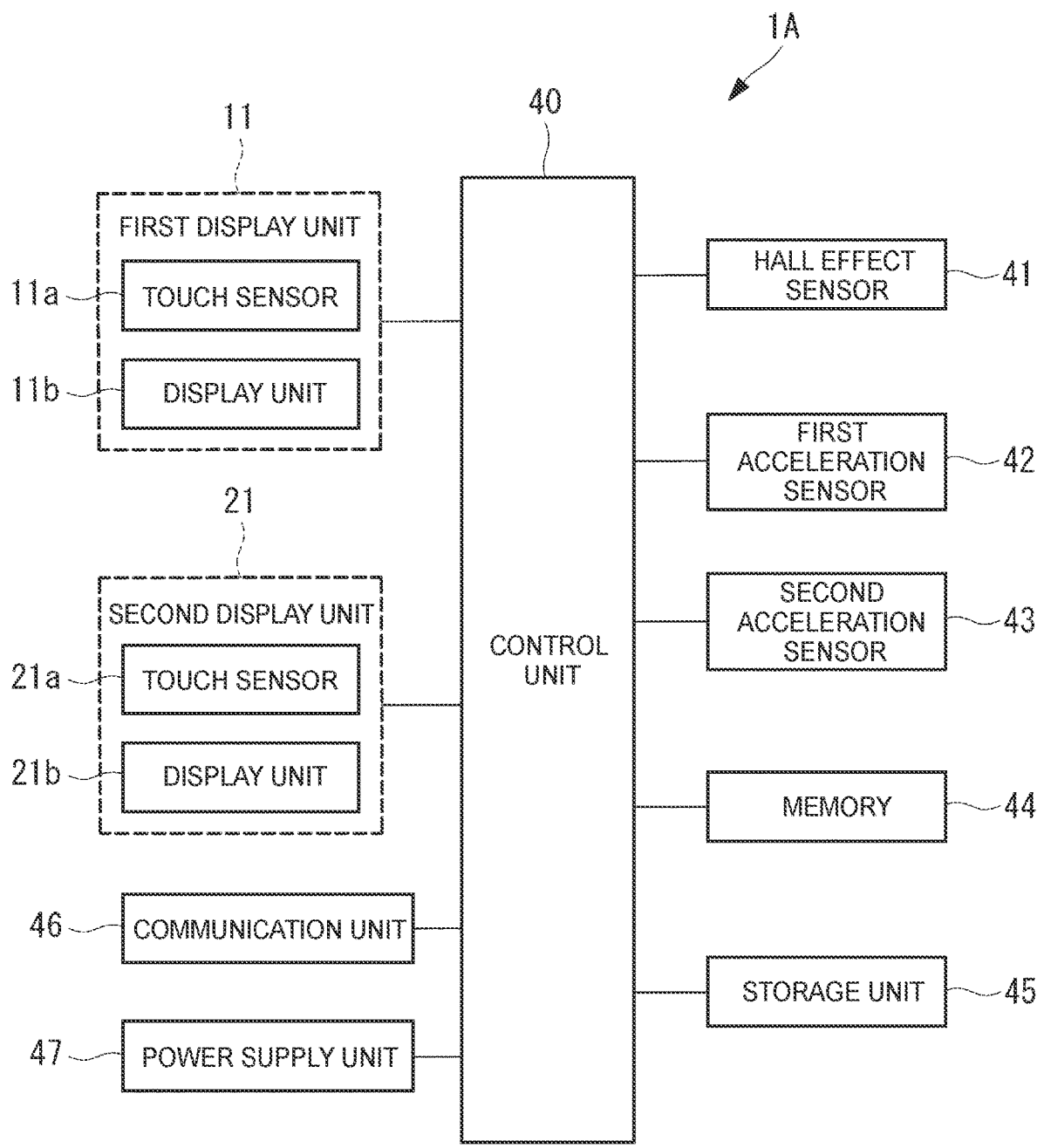
FIG. 4 is a block diagram illustrating one embodiment of an electrical configuration of the portable information processing device in accordance with the embodiment illustrated in FIG. 1.

FIG. 4 is a block diagram illustrating an electrical configuration of the portable information processing device 1A. As illustrated in FIG. 4, the portable information processing device 1A includes, in addition to the first display unit 11 and the second display unit 21, a control unit 40, a Hall effect sensor 41, a first acceleration sensor 42, a second acceleration sensor 43, a memory 44, a storage unit 45, a communication unit 46, and a power supply unit 47.

The first display unit 11 includes a display part 11b and a touch sensor 11a superimposed on the display part 11b. The second display unit 21 includes a display part 21b and a touch sensor 21a superimposed on the display part 21b.

The first display unit 11 and the second display unit 21 can accept a touch operation with a pointing input mechanism (e.g., a finger, stylus, pen, etc.) to enter an operation instruction on a target to be displayed. The touch operation may be a concept including operations in proximity (e.g., hover) positions, in addition to direct touch operations to the first display unit 11 and the second display unit 2.

The touch sensors 11a and 21a can detect various operations carried out on the touch sensors 11a and 21a using the pointing input mechanism, such as the finger, stylus, or pen together with positions of the operations on the touch sensors 11a and 21a, and provide the detection results to the control unit 40. The operations detected by the touch sensors 11a and 21a can include a touch operation, a slide operation, a tap operation, a pitch operation, and a flick operation, among other operations that are possible and contemplated herein. Various embodiments of a touch sensor 11a and/or 21a can include a capacitive type and/or a pressure-sensitive type of touch sensor, among other types of touch sensors that are possible and contemplated herein.

Each of the display parts 11b and/or 21b can be, for example, a liquid display (LCD) or an organic Electro-Luminescence (organic EL) panel to display text and graphics under the control of the control unit 40, among other types of displays that are possible and contemplated herein.

The control unit 40 can be, for example, Central Processing Unit (CPU), a microprocessor, a Digital Signal Processor (DSP), and/or the like to control the overall operation of the portable information processing device 1A to implement various functions. Specifically, the control unit 40 can execute instructions included in a program stored in, for example, the storage unit 45, while referring to data stored in the storage unit 45 and data developed in the memory 44, as needed, to implement various functions, such as a telephone function, a mail function, a web browsing function, and an image display function, among other functions that are possible and contemplated herein.

A Hall effect sensor 41 can include a Hall element in either one of the first chassis 10 and the second chassis 20, and a magnet in the other respective chassis. As a non-limiting example, a Hall element can be arranged inside the first chassis 10. The position of the Hall element can correspond to the position of a magnet (not illustrated) arranged inside the second chassis 20. That is, the Hall element and the magnet can be arranged to face each other in the closed state in which the portable information processing device 1A is enclosed.

The Hall effect sensor 41 can be such that the Hall element detects the magnetic field produced by the magnet arranged inside the second chassis 20 and, in response thereto, output the detection result of the magnetic field to the control unit 40. Since the Hall element can detect the magnetic field, the control unit 40 can determine an open/closed state of the portable information processing device 1A.

A first acceleration sensor 42 can be arranged inside the first chassis 10. The first acceleration sensor 42 can detect acceleration in an $X_1$ direction that is parallel to the long-side direction of the first display unit 11, in a $Y_1$ direction that is parallel to the short-side direction of the first display unit 11, and/or in an $Z_1$ direction that is perpendicular to the $X_1$ and $Y_1$ directions, and output, to the control unit 40, the acceleration values $Ax_1(t)$, $Ay_1(t)$, and $Az_1(t)$ of the $X_1$, $Y_1$, and $Z_1$ directions. Accordingly, the first acceleration sensor 42 can detect acceleration in the $X_1$, $Y_1$, and $Z_1$ directions, which can lead to detecting the direction of the first display unit 11.

The second acceleration sensor 43 can be arranged inside the second chassis 20. The second acceleration sensor 43 can detect acceleration in an $X_2$ direction that is parallel to the long-side direction of the second display unit 21, in a $Y_2$ direction that is parallel to the short-side direction of the second display unit 21, and in a $Z_2$ direction that is perpendicular to the $X_2$ and $Y_2$ directions, and output, to the control unit 40, the acceleration values $Ax_2(t)$, $Ay_2(t)$, and $Az_2(t)$ of the $X_2$, $Y_2$, and $Z_2$ directions. Accordingly, the second acceleration sensor 43 can detect acceleration in the $X_2$, $Y_2$, and $Z_2$ directions, which can lead to detecting the direction of the second display unit 21.

The first acceleration sensor 42 and the second acceleration sensor 43 can function as detection units that determine the orientation of the first chassis 10 and the second chassis 20. While the detection units can be used to determine the orientation of the first chassis 10 and the second chassis 20, other types of detection units are possible and contemplated herein. For example, at least one type of angular velocity sensor and/or proximity sensor, in addition to the Hall effect sensor 41, the first acceleration sensor 42, and/or the second acceleration sensor 43 may be used.

Further, a switching mechanism may be used as a detection unit to detect the angle of the second chassis 20 relative to the first chassis 10. In various embodiments, a switching mechanism may be provided in each of the hinges 30.

A memory 44 can be, for example, a Random Access Memory (RAM) or a Dynamic Random Access Memory (DRAM), which can be used as a work area in which a program can be executed by the control unit 40, data referred to by the control unit 40, computational results of the control unit 40, and/or the like can be at least temporarily stored.

A storage unit 45 may be a computer-readable storage medium that can hold programs executed by the control unit 40 and/or data. In various embodiments, a storage unit 45 can be a nonvolatile memory, such as an Electrically Erasable Programmable Read-Only Memory (EEPROM) or a Solid State Drive (SSD), etc., among other types of computer-readable storage mediums that are possible and contemplated herein.

Under the control of the control unit 40, a communication unit 46 can establish a wireless signal line with a base station via a channel allocated by the base station. The communication unit 46 can perform telephone communication and/or information communication with the base station, among other functions and/or devices that are possible and contemplated herein.

For example, multiple display units can be arranged in a manner that allows images to be displayed on the multiple display units when the multiple display units lined up one above the other (see e.g., FIG. 6). For instance, the lower display unit can set as the first display unit 11 and the upper display unit can set as the second display unit 21. In this case, when a screen object is moved from the first display unit 11 to the second display unit 21 and/or when the screen object is moved from the second display unit 21 to the first display unit 11, the control unit 40 can control the movement of the screen object(s) between the upper and lower display units (hereinafter called, "image display control processing").

Screen objects can be objects including, for example, icons, windows, and/or the like objects, among other types of objects that are movable in the display area of each display unit. In one embodiment, a screen object can include a window being moved between screens.

In one embodiment, a description is provided by exemplifying the case in which the multiple display units are arranged as illustrated in FIG. 6. That is, the multiple display units can be arranged in a manner in which the images displayed on the display units are lined up one above the other, but the various embodiments are not limited thereto. That is, other embodiments can include any other case and/or configuration in which the display units are lined up and the adjacency of the screens can be detected. For example, some embodiments can include a case in which images displayed on the multiple display units are arranged side by side. In this case, the up and down operations may be read as right and left operations.

Figure 5:
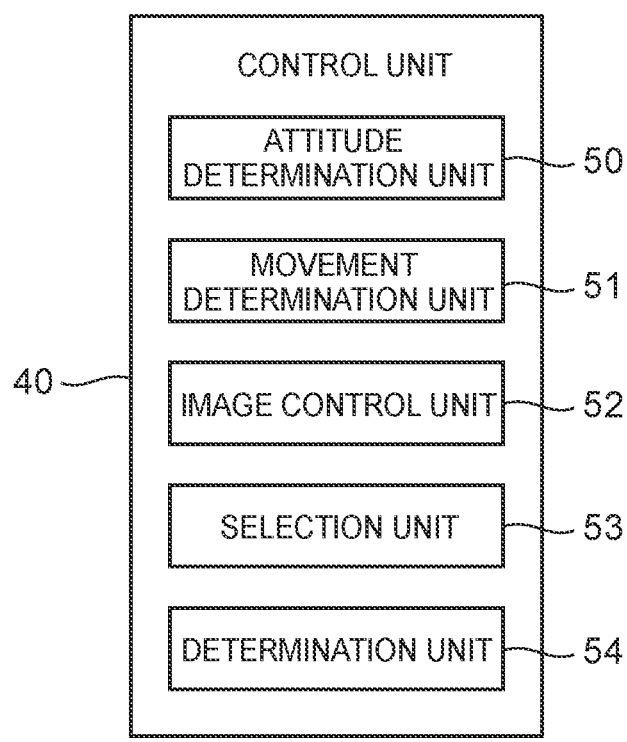
FIG. 5 is a functional block diagram related to an embodiment of an image display processing on the portable information processing device in accordance with the embodiment illustrated in FIG. 1.

FIG. 5 is a functional block diagram related to one embodiment of image display control processing. Specifically, a control unit 40 can include, among other components, an orientation determination unit 50, a movement determination unit 51, an image control unit 52, a selection unit 53, and a determination unit 54. In some embodiments, each of these constituent units can be implemented by a computer-useable program.

An orientation determination unit 50 can determines the open/closed state of a portable information processing device 1A and/or an orientation angle, which can be the angle between the first chassis 10 and the second chassis 20. In some embodiments, an orientation determination unit 50 can determine the direction of the first display unit 11 based on the acceleration values $Ax_1(t)$, $Ay_1(t)$, and $Az_1(t)$ of the $X_1$, $Y_1$, and $Z_1$ directions output from the first acceleration sensor 42, and determines the direction of the second display unit 21 based on the acceleration values $Ax_2(t)$, $Ay_2(t)$, and $Az_2(t)$ of the $X_2$, $Y_2$, and $Z_2$ directions output from the second acceleration sensor 43. In other words, an orientation determination unit 50 can determine a clamshell state, a tent state, a tablet state, or a book state based on the direction of the first display unit 11 and/or the second display unit 21. Further, the orientation determination unit 50 can determine the closed state based on the detection result of the magnetic field from the Hall effect sensor 41.

An orientation determination unit 50 can further determine the orientation angle from the direction of the first display unit 11 and/or the second display unit 21. In determining the closed state based on the detection result of the Hall effect sensor 41, the orientation determination unit 50 can set the orientation angle to 0 degrees. A selection unit 53 can select an adjoining side of the first display unit 11 and/or the second display unit 21 based on the orientation determined by the orientation determination unit 50.

A movement determination unit 51 can determine whether part of the window is moved by dragging and/or comes close to a predetermined region provided on near a side of the display unit having the window displayed thereon and to which the other display unit adjoins. Here, when multiple chassis are opened in the up and down direction in a manner that displays images on the display units with one lined up above the other, a predetermined region can be provided near a side of the lower display unit with which the upper display unit adjoins. Further, when multiple chassis are opened in the up and down direction in a manner in which the display units are lined up one above the other, the predetermined region may be provided near the side of the upper display unit on which the lower display unit adjoins. Since the predetermined region can be the boundary to jump a window from one display unit to the other display unit, the predetermined region may be referred to as a "boundary region." When multiple display units are placed in such a manner that the images displayed on the display units are positioned from side to side, the predetermined region may be provided near a side of the left display unit to which the right display unit adjoins or near a side of the right display unit to which the left display unit adjoins.

A predetermined region can be set appropriately in the display unit provided in the upper chassis and/or in the display unit provided in the lower chassis. The width of a predetermined region (e.g., a region width in a direction parallel to the side) and/or a shape of the predetermined region may include any suitable dimension(s) and/or shape that is known or developed in the future and are not particularly limited to the illustrated embodiments. That is, the predetermined regions on the upper and lower sides may be the same or different widths and/or the same or different shapes.

The following description is provided based on a predetermined region that is set, for example, by presetting, in the storage unit 45 or the like, a value set by the user. Other embodiments may be preset using various other setting techniques. Further, a movement determination unit 51 can determine whether a touch and/or move operation is carried out by a predetermined amount of movement, which can determine whether a flick operation is performed to move the window on the display unit.

A determination unit 54 can detect a vector direction in which the window is moved. In additional or alternative embodiments, a determination unit 54 can determine whether there is another display unit adjoining the display unit that is currently displaying the window in the vector direction of the moving window. When determining that there is the other display unit adjoining the display unit currently displaying the window, the determination unit 54 can move the window. Further, when determining that no other display unit is adjoining the display unit currently displaying the window, the determination unit 54 may not move the window beyond the predetermined region of the display unit having the window being currently displayed.

Based on the determination result of the movement determination unit 51 and/or the detection result of each sensor (e.g., the determination result of the orientation determination unit 50), the image control unit 52 can control the image display of the first display unit 11 and/or the second display unit 21. Specifically, the image control unit 52 can display, on the other display unit, part of the window being displayed on one display unit in a state (e.g., the clamshell state, the book state, or the tent state, depending on the orientation angle). Further, when the movement determination unit 51 determines that part of the window is moved to the predetermined region in the display unit currently displaying the window, the image control unit 52 can display, on the other display unit, at least part of the window.

A display method of displaying, on the other display unit, at least part of the window currently displayed on the display unit displaying the window is not limited to the illustrated embodiment. That is, a window may be displayed across the display unit and the other display unit, or the whole window may be cleared from the display unit and displayed on the other display unit. In one embodiment, the description is given by taking, as an example, a case in which the window is displayed across the display unit displaying the window and the other display unit.

Figure 6A:
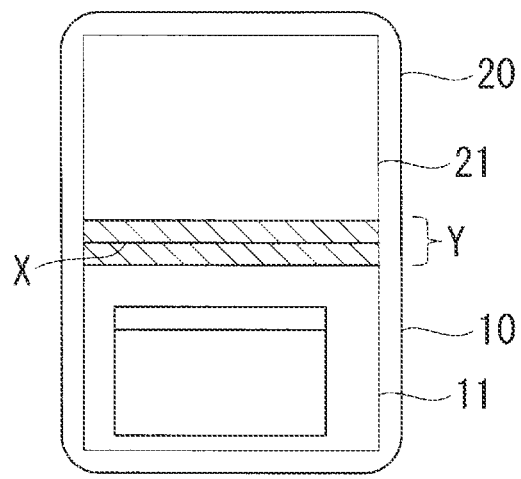
FIG. 6A illustrates one embodiment of a state of displaying a window on a first display unit.
Figure 6C:
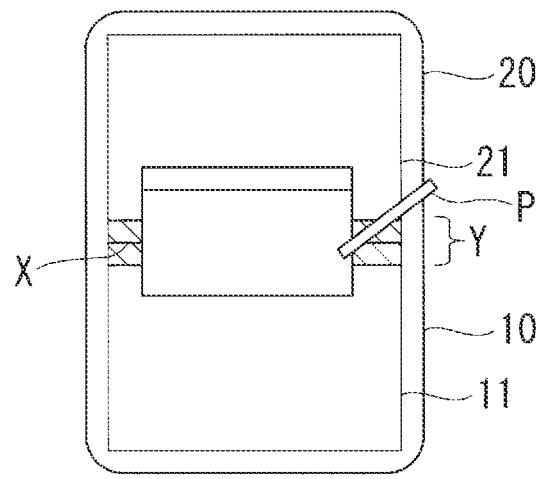
FIG. 6C illustrates one embodiment of a state in which a window on a first display unit jumps to a second display unit.
Figure 6B:
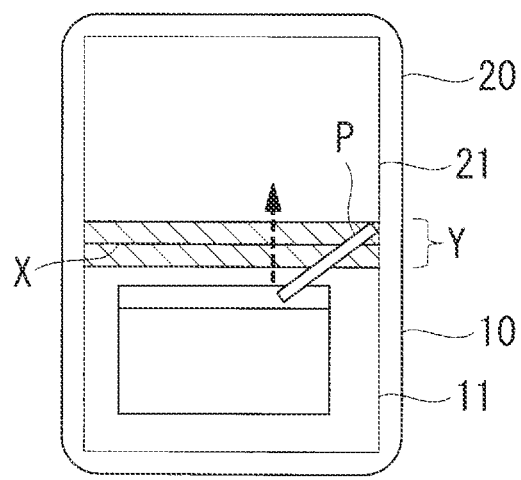
FIG. 6B illustrates an embodiment of a state of using a pointing input mechanism to hold the window displayed on the first display unit.
Figure 6D:
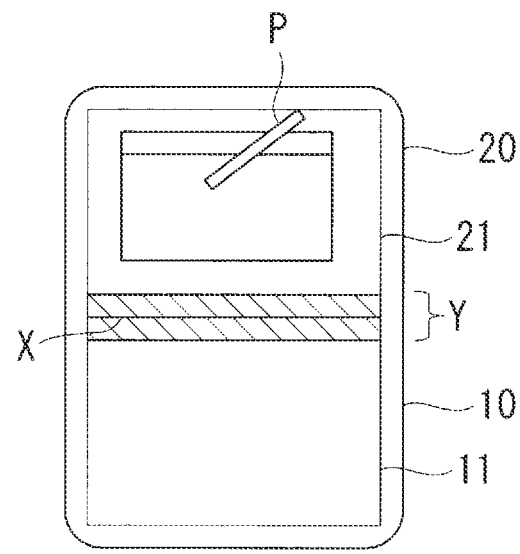
FIG. 6D illustrates one embodiment of a state in which a window displayed on a second display unit is slid and/or moved to make the whole window displayed on the second display unit.

FIG. 6A is an image diagram illustrating one embodiment of a state of displaying a window on the first display unit 11, FIG. 6B is an image diagram illustrating a state of using a pointing input mechanism P to hold the window displayed on the first display unit 11, and FIG. 6C is an image diagram illustrating a state of moving the pointing input mechanism P holding the window to a predetermined region Y near a side X and making the window jump onto the second display unit 21. FIG. 6D is an image diagram illustrating a state in which part of the window displayed on the second display unit 21 in FIG. 6C is slid and moved to make the whole window displayed on the second display unit 21.

In some embodiments, the first display unit 11 and the second display unit 21 may be virtually combined to form a large virtual display with adjacent sides of the adjacent display units set as a shared side. For example, when the window is held with the pointing input mechanism P and moved to the predetermined region Y provided near the side X on which the display unit and the other display unit adjoin each other, the window can jump onto the other adjoining display unit and be displayed on the other display unit. Thus, when part of the window displayed on the display unit is moved to the predetermined region Y provided near the side X to which the other display unit adjoins and determined to reach the predetermined region Y, the window can be displayed across the display unit currently displaying the window to the other adjoining display unit.

In the case of touch panel display, the display unit can be directly touched using the pointing input mechanism P to operate the window. Using the touch panel display, if the window is moved across multiple display units, it can be difficult to move the window in conventional touch screens because one display unit and the other display unit are physically spaced apart. According to various embodiments disclosed herein, when part of the window reaches the predetermined region Y near the side X to which the other display unit adjoins, the part of window jumps onto the adjoining (or destination) display unit. As such, a window can be displayed across the display unit with which the window was originally displayed and also to the destination display unit, which allows the window to be moved to the window on the portable information processing device 1A including multiple display units with relative ease.

Figure 7A:
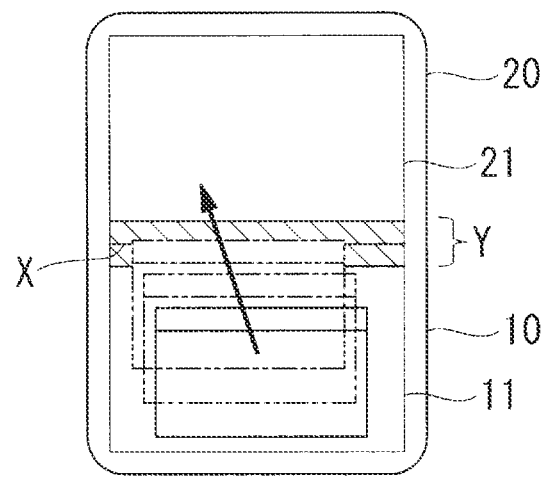
FIGS. 7A and 7B illustrate embodiments of a state in which a user performs a flick operation to flick a window and in which the window jumps onto another display unit after the flick operation, respectively.
Figure 7B:
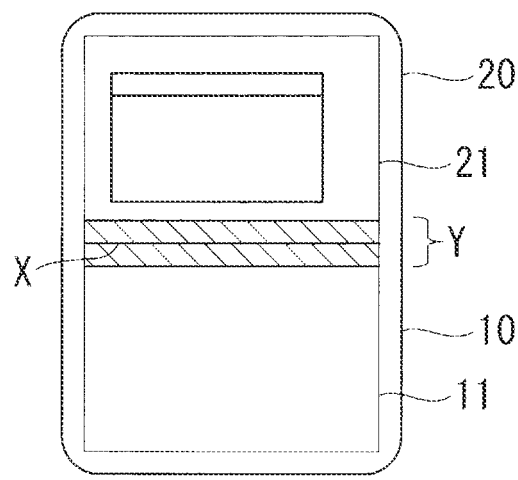

Further embodiments may correspond to a flick operation of the window over display units using the pointing input mechanism P. One example includes a user performing a flick operation to flick the window on a display unit with the window displayed (see e.g., FIG. 7A). In this case, when part of the window reaches the predetermined region Y near the adjoining side X, the window is moved from the display unit having the window displayed thereon to the other display unit (see FIG. 7B). Since the window that reaches the predetermined region Y near the side X of the adjacent display units is moved by the flick operation to a predetermined position of the other display unit in which the window is not displayed, the window can be moved relatively easily.

To determine whether the flick operation is performed, the movement determination unit 51 can observe the touch operation to determine whether the amount of movement exceeds a predetermined amount. That is, when the amount of movement exceeds the predetermined amount, the movement determination unit 51 can determine that a flick operation has been performed.

Further, as the destination of the window, the vector direction at the time of the flick operation can be detected. Further, when there is a display unit adjoining the original display unit in a direction in which the largest vector component is detected, the window is moved to the adjoining display unit. Such an image display is provided in the clamshell state and the book state. Thus, the window can be moved in the direction of the side acceptable depending on the predetermined orientation states, such as the clamshell state and/or the book state.

Subsequently, a case of a tent mode (e.g., a tent state) as an orientation in which the back faces of respective chassis with no display unit provided face each other will be described. In the tent mode of the first chassis 10 and the second chassis 20, as illustrated in FIG. 3A, the selection unit 53 can select a side on which the display units adjoin each other. In this case, when the window of one display unit is made to appear from the side of the other display unit, the window is displayed on the side of the other display unit to come down from the top of the screen and the window is displayed upside down.

As such, in the tent mode, the side may be provided so that a side to which the other display unit adjoins may be set as the top of the screen on the side of the other display unit, a side opposite to the side is set as the bottom of the screen, and the bottom of the screen is set as the side to which the one display unit adjoins. For example, when a part of window or the pointing input mechanism used to select the window is moved to the predetermined region on the display unit having the window displayed thereon, the window is moved onto the other display unit, from the opposite side of the side on which the display unit and the other display unit adjoin each other, and at least part of the window is displayed on the other display unit. Specifically, when part of the window enters the predetermined region on the display unit having the window displayed thereon, the coordinates of the other adjoining display unit may be transformed based on the assumption that the adjoining side is the bottom of the screen to move the window from the bottom of the screen and display the window on the other display unit. Thus, in the tent mode, the way to select the side can be made different from that in the clamshell state to prevent the window from being displayed upside down on the other display unit.

In a further example, in an orientation in which the back sides of the first chassis 10 and the second chassis 20 face each other in the tent mode, even when part of the window is moved to enter the predetermined region on the display unit with the window displayed, the window may be set not to be moved to the other display unit.

Figure 8:
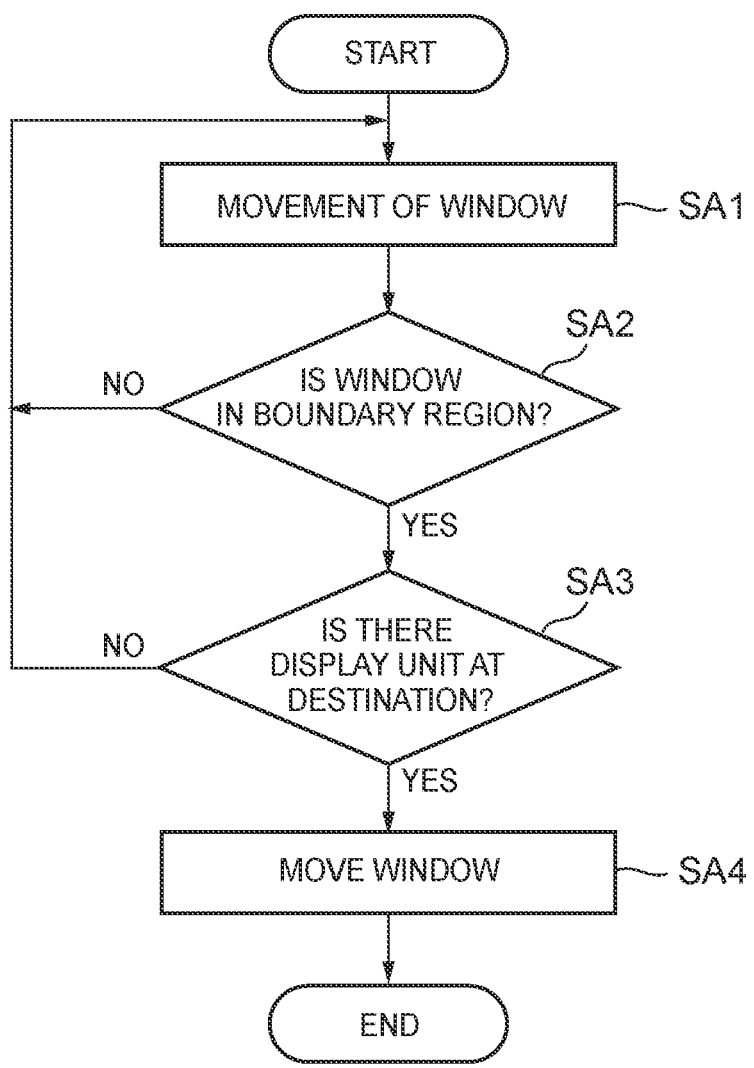
FIG. 8 is a flowchart of processing for moving a window with a drag operation on the portable information processing device in accordance with one embodiment.

FIG. 8 is a flowchart illustrating a flow of one embodiment of the image display control processing. An orientation angle can be determined from the directions of the first display unit 11 and the second display unit 21 and a window can be operated on the display unit having the window displayed thereon to move the window, as illustrated in FIG. 6A (block SA1 in FIG. 8). The display unit may be touched, as illustrated in FIG. 6B, to move the window in the touch position along with the touch and move operation. In response thereto, is determined whether a drag operation has been performed to drag part of the window into the predetermined region Y near the side X on which the display unit having the window displayed thereon and the other adjoining display unit adjoin each other (block SA2 in FIG. 8). In response to determining that part of the window does not reach (enter) the predetermined region Y near the selected side X, the flow returns to block SA1. In response to determining that part of the window reaches the predetermined region Y, it is determined whether there is an adjoining display unit at the destination of the window (block SA3 in FIG. 8).

In response to determining that there is no display unit adjoining in the vector direction, the flow returns to block SA1. In response to determining that there is an adjoining display unit at the destination of the window, the window is made to jump by a predetermined amount onto the adjoining display unit (see FIG. 6C).

The window jumps in this manner to display the moved window across the display unit displaying the window before the movement, and the display unit as the destination of the window (block SA4 in FIG. 8). Processing may then end. Since part of the window is displayed on the display unit as the destination, the user can touch and move the window on the display unit as the display unit to display the whole window (see FIG. 6D).

Figure 9:
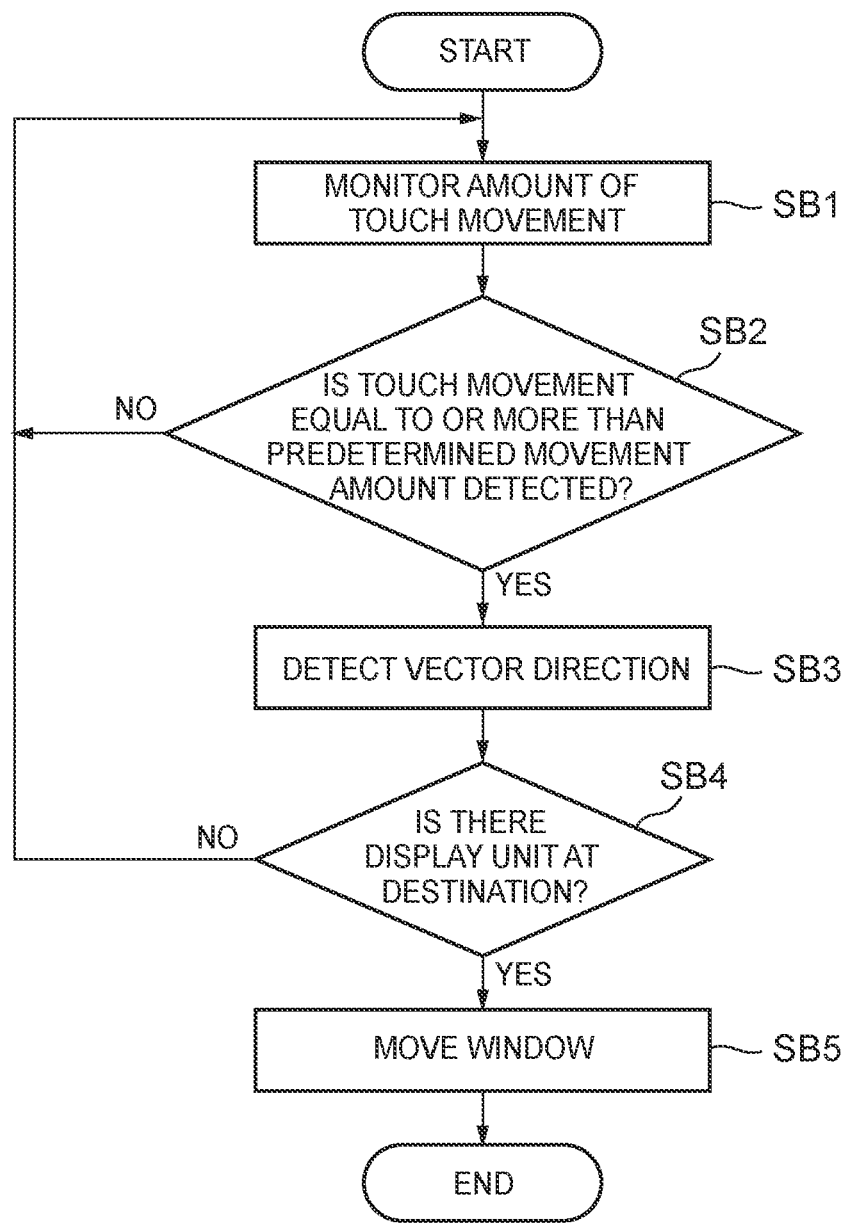
FIG. 9 is a flowchart of processing for moving a window with a flick operation on the portable information processing device in accordance with an additional or alternative embodiment.

FIG. 9 is a flowchart illustrating a flow of another embodiment of an image display control processing. An orientation angle is determined from the directions of the first display unit 11 and the second display unit 21, a display unit is touched, and a window in the touch position is moved along with the touch and the movement. The amount of touch movement is monitored on the display unit with the window displayed (block SB1 in FIG. 9). It is determined whether touch movement greater than or equal to a predetermined amount of movement as a threshold value is used to determine and/or detect a flick operation on the display unit (block SB2 in FIG. 9). In response to the touch movement greater than or equal to the predetermined amount of movement not being detected (e.g., a "NO" in block SB2), the flow returns to block SB1. When the touch movement is greater than or equal to the predetermined amount of movement is detected (e.g., a "YES" in block SB2), a vector direction in which the window is moved is detected (block SB3 in FIG. 9).

It is then determined whether there is an adjoining display unit at a destination of the vector direction (block SB4 in FIG. 9). In response to determining that there is no adjoining display unit in the vector direction (e.g., a "NO" in block SB4), block SB1 is repeated. In response to determining that there is an adjoining display unit in the vector direction (e.g., a "YES" in block SB4), a side X near the adjoining display unit in the vector direction is selected. It is then determined whether part of the window enters a predetermined region Y provided near the selected side X, and the determination as to whether part of the window enters the predetermined region Y is repeated until the part of the window enters the predetermined region Y. When part of the window enters the predetermined region Y, the whole window is moved to the adjoining display unit in the vector direction (see FIG. 6C).

When this is done, the window is cleared from the display unit with the window originally displayed, and the whole window after being subjected to the flick operation is displayed on the display unit as the destination (block SB5 in FIG. 9).

In the embodiments illustrated in FIG. 8 and FIG. 9, the description is provided by dividing the display method into a method of making the window jump to display the window across the multiple display units, and a method of performing the flick operation to flick and display the window, but both the display with the jumping operation and the display with the flick operation may also be enabled at the same time, or enabling/disenabling of respective functions may be set on a setting screen (not illustrated).

As described above, the portable information processing device 1A, the image display method, and the image display program according to various embodiments includes the first chassis 10 and the second chassis 20, where the first chassis 10 and the second chassis 20 can be foldable by the hinges 30 that couple the chassis together. When part of a window of the display unit having the window displayed thereon is moved to enter a predetermined region provided near the side to which another display unit adjoins, the window is displayed across the display unit to the other display unit. Then, a portable information processing device 1A can identify a side of adjoining display units according to the orientation of the first chassis 10 and the second chassis 20, and handle the adjoining display units virtually as one display unit. That is, the portable information processing device 1A can move the window across the side boundary from one display unit to the other display unit to provide an image display.

In a touch panel display environment, each display unit can be directly touched with the pointing input mechanism to operate the window. In the touch panel display, if the window is operated across multiple display units, it can be difficult to move the window because one display unit and the other display unit are physically spaced apart. According to various embodiments discussed herein, a window can be relatively easily moved between multiple display units, even in a touch panel display environment.

Further, since it can be determined that part of the window (or the pointing input mechanism used to hold the window) reaches a predetermined region near the side of the display unit having the window displayed thereon, part of the window can be made to jump onto another display unit and displayed thereon, which can display the window across the side from the display unit originally displaying the window to the destination display unit as the destination. This can enable the window to be moved in a user-friendly manner.

Further, when displays are arranged one above the other, there is a portable information processing device including, for example, a function of the OS to maximize a window on a lower display unit when the window is moved from the lower display unit to an upper display unit in a state of holding the window with a pointing input mechanism. Such a function can maximize the window on the lower display unit despite a user's intention to move the window from the lower display unit to the upper display unit, which can make it difficult to perform an intended operation. According to various embodiments presented herein, since the display unit to display the window is switched from the display unit having the window displayed thereon to the other display unit at the stage of reaching the predetermined region near the side on which the multiple display units adjoin each other, the window can be moved quickly between multiple display units.

In the above-mentioned embodiments, the descriptions are given by taking, as an example, the case in which the window is moved from the lower display unit to the upper display unit that are arranged one above the other, but the scope of the various embodiments is not limited thereto. The scope also includes a case in which the window is moved from the upper display unit to the lower display unit.

Further, in various embodiments, the description is given by taking, as an example, the case where the window is moved between display units, but an icon may also be moved between display units in the same manner.

In some embodiments discussed thus far, a window can be displayed on another display unit when part of the window enters the predetermined region near the side. In other embodiments, a window can be displayed on the other display unit when the pointing input mechanism used to hold the window enters the predetermined region near the side. For an information processing device of these embodiments, the description of points common to those of previous embodiments is omitted and different points will be mainly described with reference to FIG. 1 to FIG. 5.

The movement determination unit 51 can determine whether part of a pointing input mechanism, such as a finger, stylus, or a pen used to hold a window is moved to enter a predetermined region provided near a side of a display unit having the window displayed thereon, to which another display unit adjoins. Specifically, the position of the pointing input mechanism can be determined based on the detection values detected by the touch sensor 11a of the first display unit 11 and the touch sensor 21a of the second display unit 21.

The image control unit 52 can control the image display of the first display unit 11 and the second display unit 21 based on the determination result of the movement determination unit 51 and the detection result of each sensor, (e.g., the determination result of the orientation determination unit 50). Specifically, in response to the movement determination unit 51 determining that part of the pointing input mechanism used to hold the window is moved to the predetermined region, the image control unit 52 moves the window by a predetermined amount to display the window across the display unit and the other display unit.

Thus, the presence of a pointing input mechanism used to hold the window can be detected/determined prior to the window reaching the predetermined region near the side on which display units adjoin each other. When the pointing input mechanism used to hold the window reaches the predetermined region, the window is moved between adjoining display units. Accordingly, even when part of the window does not reach the predetermined region, the window can be made to jump onto the other display unit by monitoring the position of the pointing input mechanism.

As described above, specific embodiments are described, but the technical scope of the various embodiments is not limited to those described. Various changes and/or improvements can be added to each of the aforementioned embodiments without departing from the spirit and/or scope of the various embodiments, and forms to which the changes or improvements are added shall also be included in the technical scope of the various embodiments. Further, the aforementioned embodiments may also be combined.

In the aforementioned embodiments, the coupling parts that couple a pair of chassis are described as the hinges 30, but the various embodiments are not limited to hinges. Any other coupling mechanism and/or device can be adopted provided the coupling mechanism can rotatably couple the pair of chassis.

Further, in the aforementioned embodiments, the information processing device includes two chassis, but the various embodiments are not limited thereto. Other embodiments may include three or more chassis arranged on an information processing device.

In addition, the flow of image display control processing described in each of the aforementioned embodiments is just an example, and it is possible to delete an unnecessary block, add a new block, or replace the processing order without departing from the spirit and/or scope of the various embodiments.

What is claimed is:

1. An apparatus, comprising:
a processor of an information handling device; and
a memory that stores code executable by the processor to:
detect a pointing input mechanism moving a selected screen window to a predetermined region of a first touch display unit via the pointing input mechanism performing a touch operation on the first touch display unit that moves the selected screen window from an initial position on the first touch display unit to the predetermined region of the first touch display unit, and
in response to detecting that a portion of the selected screen window is located at the predetermined region of the first touch display unit, move the selected screen window to a second display unit to display an entirety of the screen window on the second display unit without the pointing input mechanism touching the second display unit.

2. The apparatus of claim 1, wherein:
the first touch display unit and the second display unit are arranged such that the first touch display unit is vertically above the second display unit; and
the predetermined region is provided on a bottom side of the first touch display unit.

3. The apparatus of claim 1, wherein:
the first touch display unit and the second display unit are arranged such that the second display unit is vertically above the first touch display unit; and
the predetermined region is provided on a top side of the first touch display unit.

4. The apparatus of claim 1, further comprising:
a first chassis including the first touch display unit; and
a second chassis including the second display unit,
wherein the code is further executable by the processor to:
determine an orientation angle between the first chassis and the second chassis, and
display the screen window on the second display unit based on the orientation angle.

5. The apparatus of claim 4, wherein a first side of the first chassis and a second side of the second chassis are rotatably coupled to each other.

6. The apparatus of claim 5, wherein:
the first side and the second side are rotatable from a 0-degree position in which display surfaces of the first touch display unit and the second display unit face each other to a 180-degree position in which the display surfaces of the first chassis and the second chassis are parallel to each other; and
the orientation angle includes an angle in a range of 0 degrees to 180 degrees.

7. The apparatus of claim 5, wherein;
the first side and the second side are rotatable from a 180-degree position in which display surfaces of the first touch display unit and the second display unit run parallel to each other to a 360-degree position in which back faces of the first chassis and the second chassis face each other; and
the orientation angle includes an angle in a range of 180 degrees to 360 degrees.

8. The apparatus of claim 5, wherein:
the first side and the second side are rotatable from a 0-degree position in which display surfaces of the first touch display unit and the second display unit face each other to a 360-degree position in which back faces of the first chassis and the second chassis face each other; and
the orientation angle includes an angle in a range of 0 degrees to 360 degrees.

9. The apparatus of claim 5, wherein at least one of the first chassis and the second chassis are rotatable to provide one of a book state, a clamshell state, a tent state, and a tablet state.

10. The apparatus of claim 1, wherein:
the first touch display unit and the second display unit are arranged horizontally such that the second display unit is beside the first touch display unit; and
the predetermined region is provided on a side of the first touch display unit that is proximate to the second display unit.

11. The apparatus of claim 1, wherein the touch operation is a drag operation.

12. A method, comprising:
detecting, by a processing device, a pointing input mechanism moving a selected screen window to a predetermined region of a first touch display unit via the pointing input mechanism performing a touch operation on the first touch display unit that moves the selected screen window from an initial position on the first touch display unit to the predetermined region of the first touch display unit; and
in response to detecting that a portion of the selected screen window is located at the predetermined region of the first touch display unit, moving the selected screen window to a second display unit to display an entirety of the screen window on the second display unit without the pointing input mechanism touching the second display unit.

13. The method of claim 12, wherein the first touch display unit is included on a first chassis and the second display unit is included on a second chassis, the method further comprising:
- determining an orientation angle between the first chassis and the second chassis; and
- displaying the screen window on the second display unit based on the orientation angle.

14. The method of claim 13, wherein the orientation angle includes an angle in a range of 0 degrees to 360 and the first chassis and the second chassis are rotatable from a 0-degree position in which display surfaces of the first touch display unit and the second display unit face each other and a 360-degree position in which back faces of the first chassis and the second chassis face each other, the method further comprising:
- rotating at least one of the first chassis and the second chassis to provide one of a book state, a clamshell state, a tent state, and a tablet state.

15. The method of claim 12, wherein the touch operation is a drag operation.

16. A program product comprising a computer-readable storage medium that stores code executable by a processor, the executable code comprising code to perform:
- detecting a pointing input mechanism moving a selected screen window to a predetermined region of a first touch display unit via the pointing input mechanism performing a touch operation on the first touch display unit that moves the selected screen window from an initial position on the first touch display unit to the predetermined region of the first touch display unit; and
- in response to detecting that a portion of the selected screen window is located at the predetermined region of the first touch display unit, moving the selected screen window to a second display unit to display an entirety of the screen window on the second display unit without the pointing input mechanism touching the second display unit.

17. The program product of claim 16, wherein the first touch display unit is included on a first chassis and the second display unit is included on a second chassis, the program product further comprising code to perform:
- determining an orientation angle between the first chassis and the second chassis; and
- displaying the screen window on the second display unit based on the orientation angle.

18. The program product of claim 17, wherein the orientation angle includes an angle in a range of 0 degrees to 360 and the first chassis and the second chassis are rotatable from a 0-degree position in which display surfaces of the first touch display unit and the second display unit face each other and a 360-degree position in which back faces of the first chassis and the second chassis face each other, the program product further comprising code to perform:
- rotating at least one of the first chassis and the second chassis to provide one of a book state, a clamshell state, a tent state, and a tablet state.

19. The program product of claim 16, wherein the touch operation is a drag operation.

* * * * *